(12) United States Patent  (10) Patent No.: US 6,386,657 B1
Frifeldt  (45) Date of Patent: May 14, 2002

(54) ENCLOSURE SYSTEM FOR A WIRE SHELF STRUCTURE

(76) Inventor: Carrie Marie Frifeldt, P.O. Box 12039, Chicago, IL (US) 60610

( * ) Notice: Subject to any disclaimer, the term of this patent is extended or adjusted under 35 U.S.C. 154(b) by 0 days.

(21) Appl. No.: 09/473,168

(22) Filed: Dec. 28, 1999

(51) Int. Cl.$^7$ .............................................. A47G 29/00
(52) U.S. Cl. ............................... 312/265.1; 312/265.2; 108/27; 211/186
(58) Field of Search ........................... 312/265.6, 265.2, 312/265.3, 327, 295, 140.2; 108/110, 107, 27; 211/191, 181.1, 180, 186, 183; 52/222

(56) References Cited

U.S. PATENT DOCUMENTS

| | | |
|---|---|---|
| 3,589,746 A | 6/1971 | Inglis et al. |
| 4,095,861 A | 6/1978 | Kachidurian |
| 4,222,579 A | 9/1980 | Frydendal |
| 4,250,676 A * | 2/1981 | Presby ........................ 52/222 |
| 4,359,792 A | 11/1982 | Dale |
| 4,416,380 A * | 11/1983 | Flum ................... 211/181.1 X |
| 4,550,956 A | 11/1985 | Cohn et al. |
| 4,595,107 A | 6/1986 | Welsch |
| D323,051 S | 1/1992 | Baggott |
| 5,221,014 A | 6/1993 | Welch et al. |
| 5,314,244 A | 5/1994 | Swets et al. |
| 5,390,803 A | 2/1995 | McAllister |
| 5,573,125 A * | 11/1996 | Denny .................... 211/191 X |
| 5,601,038 A | 2/1997 | Welch et al. |
| 5,622,415 A * | 4/1997 | Felsanthal et al. ...... 108/110 X |
| 5,722,544 A * | 3/1998 | Williams ................ 211/186 X |
| 5,768,722 A | 6/1998 | Olson et al. |
| 5,779,070 A | 7/1998 | Dickinson et al. |

* cited by examiner

Primary Examiner—Peter M. Cuomo
Assistant Examiner—Michael J. Fisher
(74) Attorney, Agent, or Firm—Michael R. McKenna

(57) ABSTRACT

An enclosure system, for a wire shelf structure, that includes a plurality of generally rectangular resilient flat panels that snaps into the side openings of the wire shelf structure without tools and generally without the need for fasteners.

34 Claims, 8 Drawing Sheets

FIG. 1
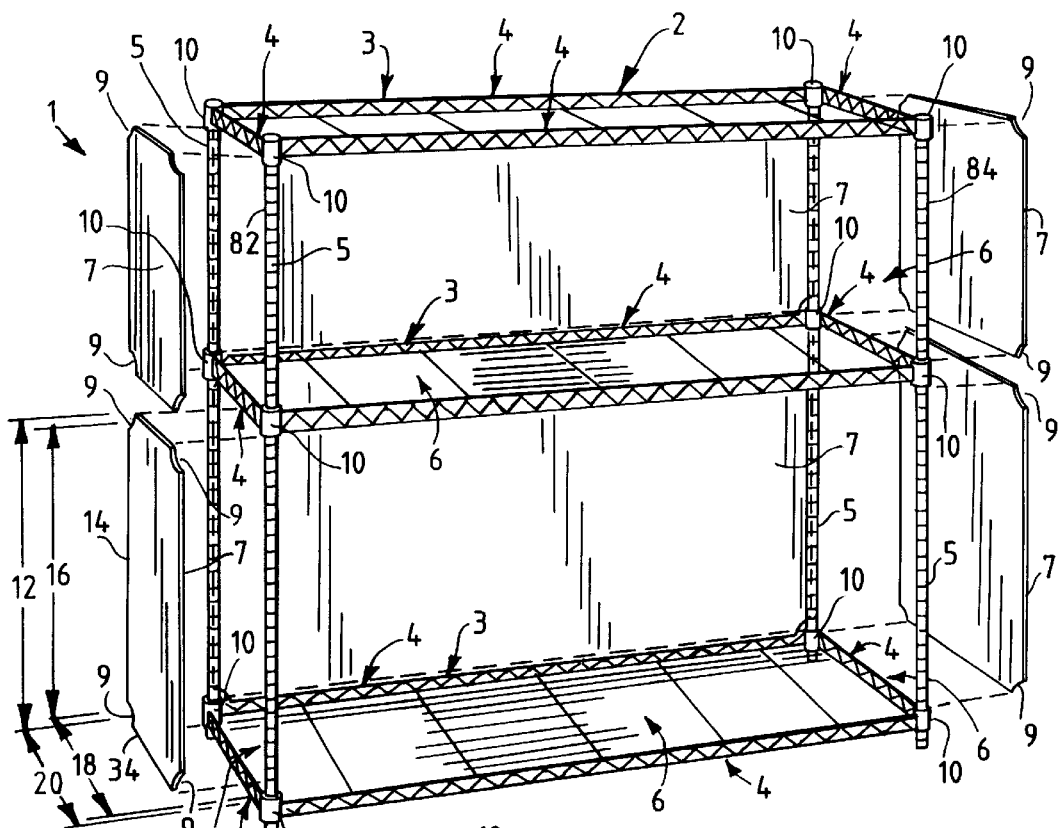
FIG. 3
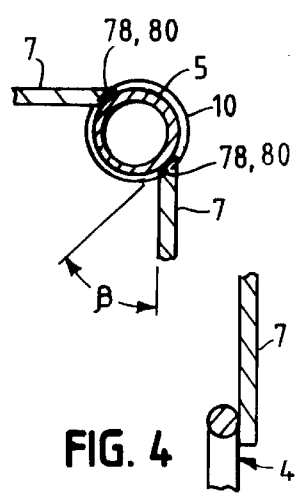
FIG. 4
FIG. 2
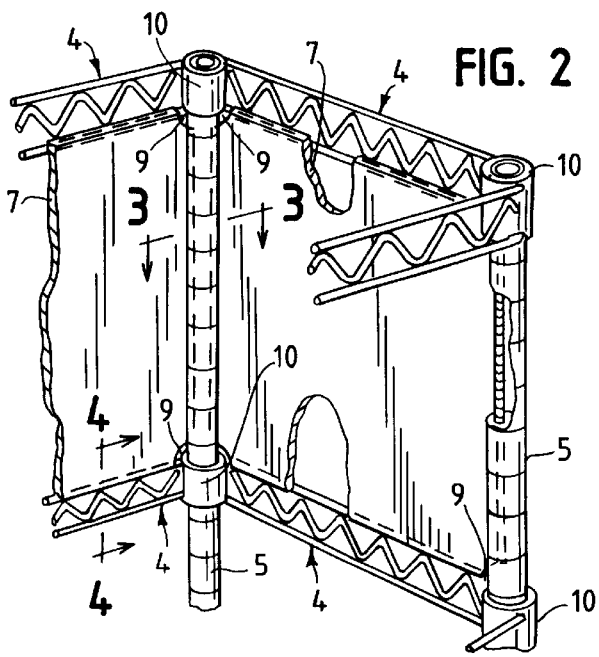

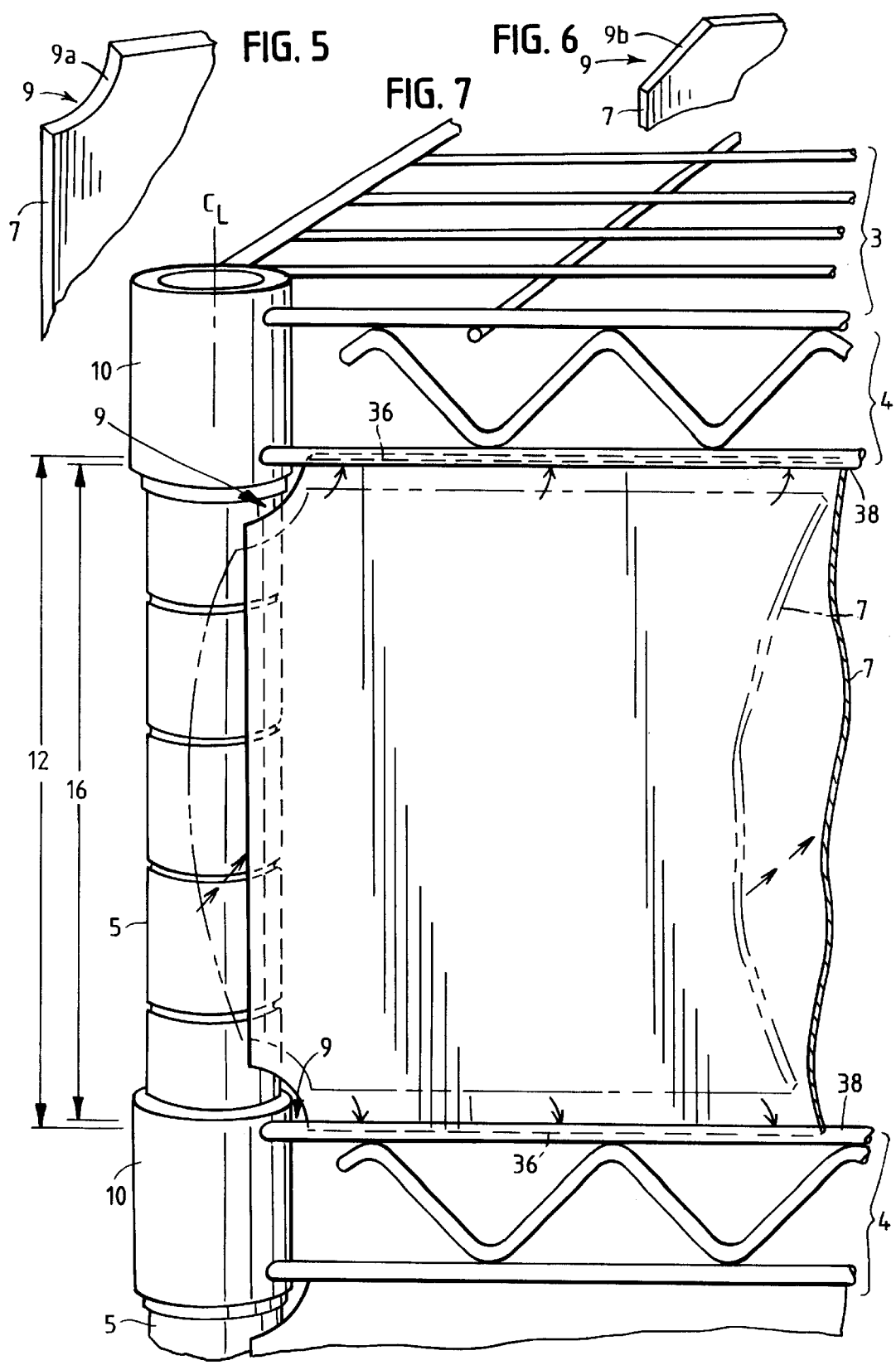

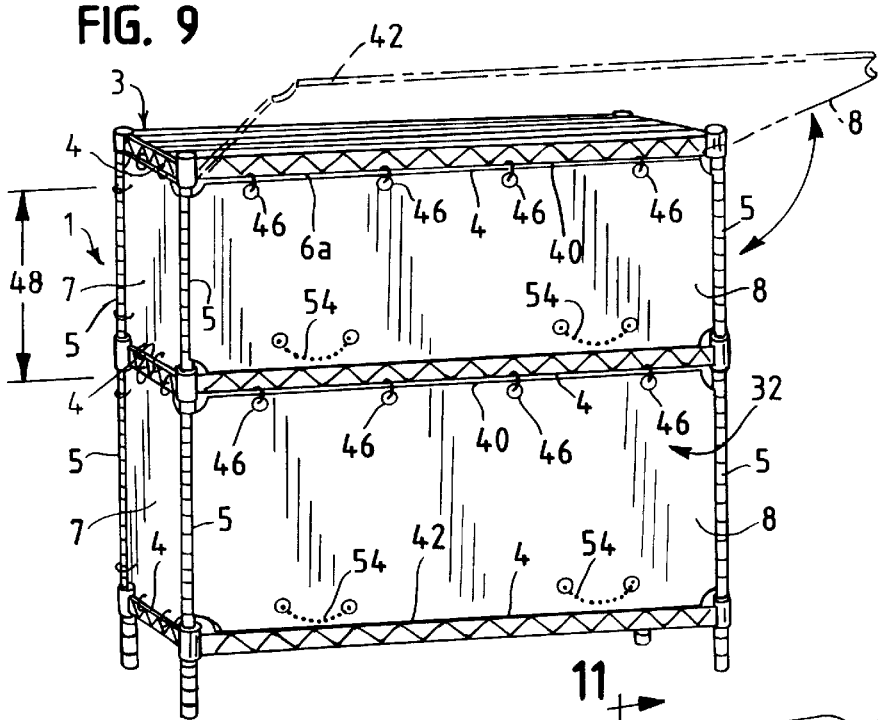
FIG. 9
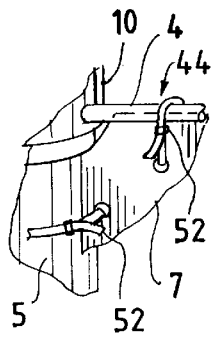
FIG. 8
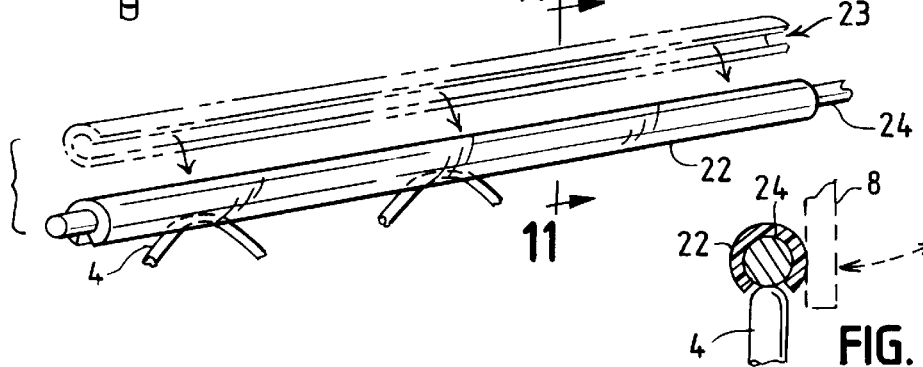
FIG. 10
FIG. 11
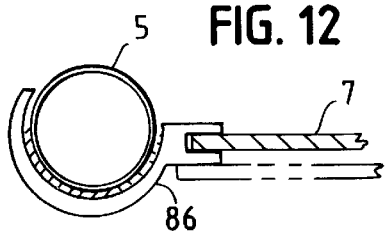
FIG. 12
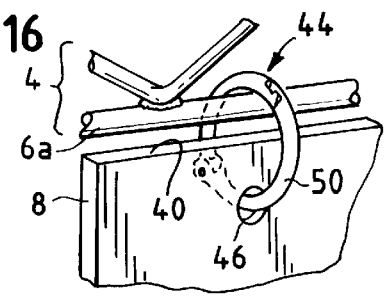
FIG. 16
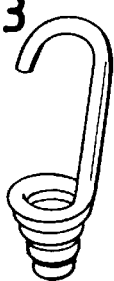
FIG. 13
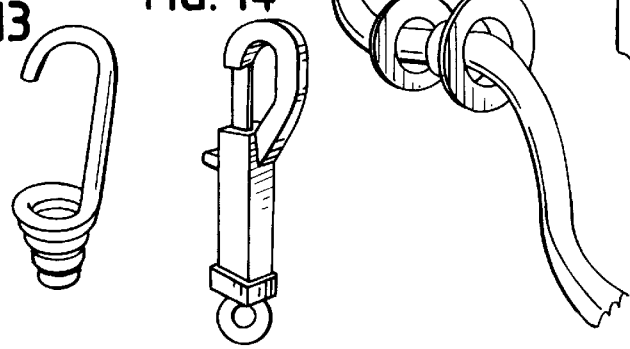
FIG. 14  FIG. 15

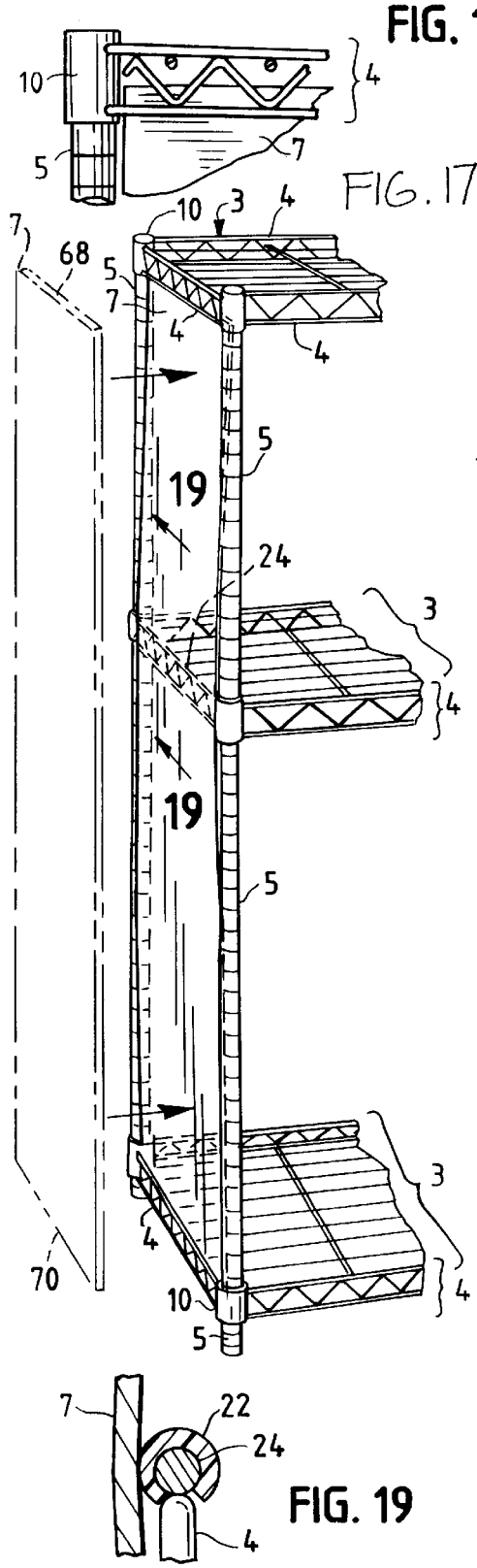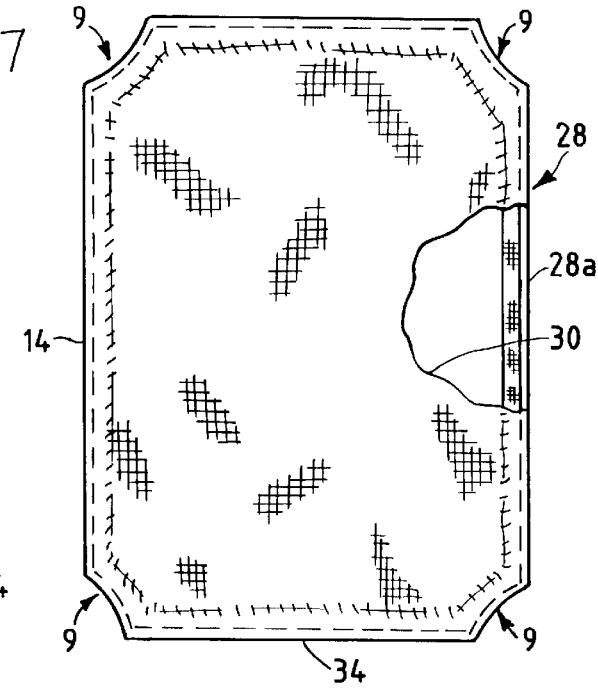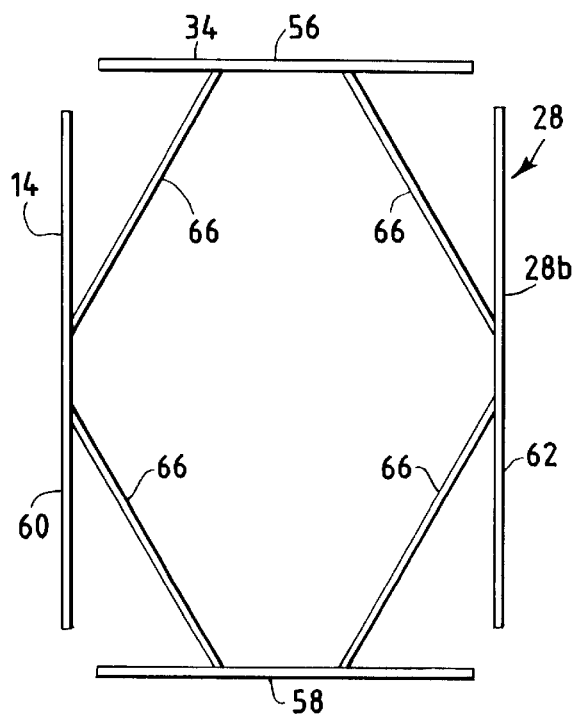

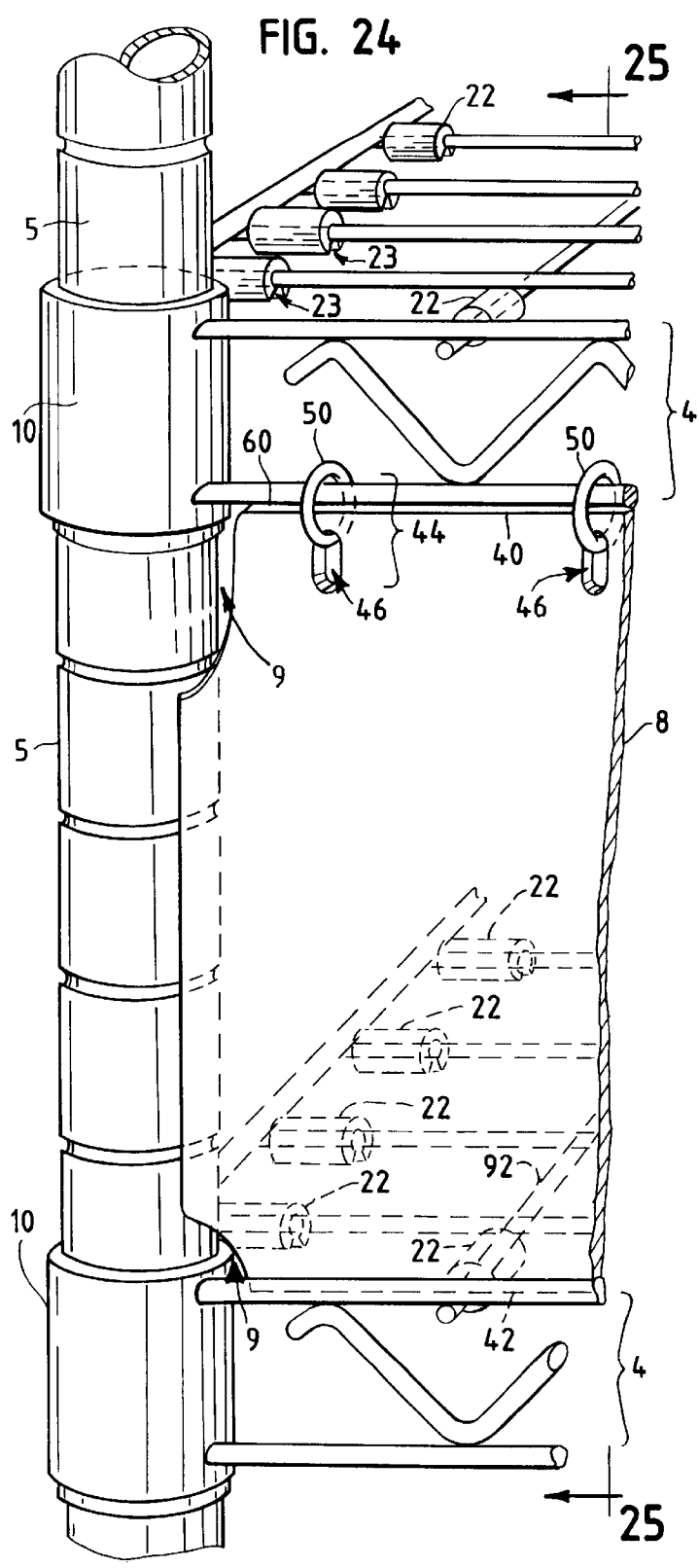
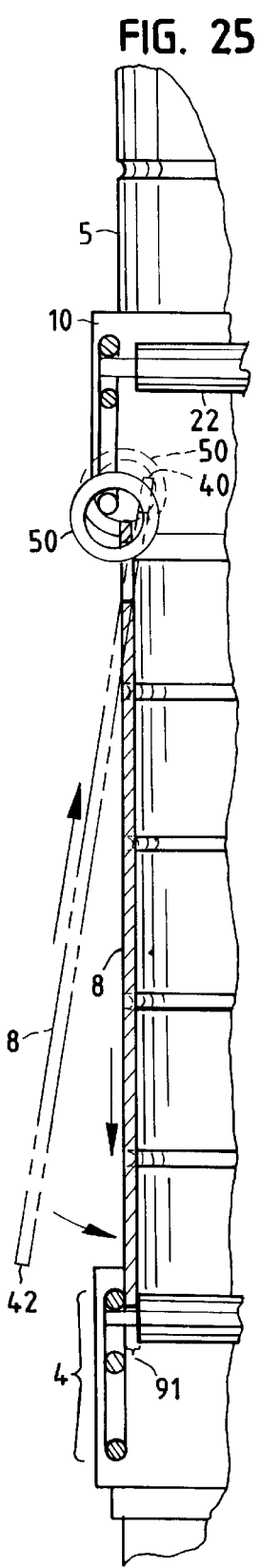
FIG. 24
FIG. 25

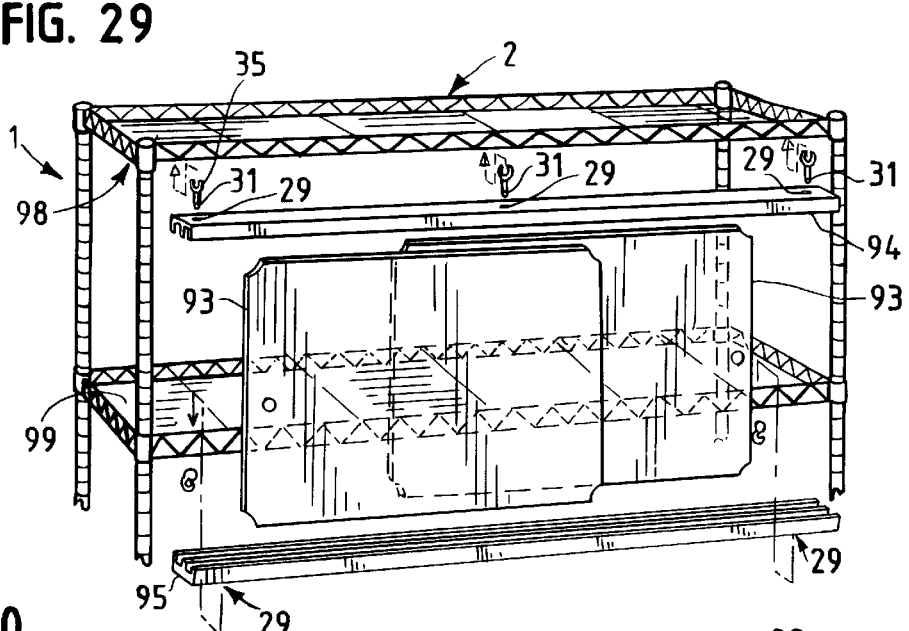
FIG. 29
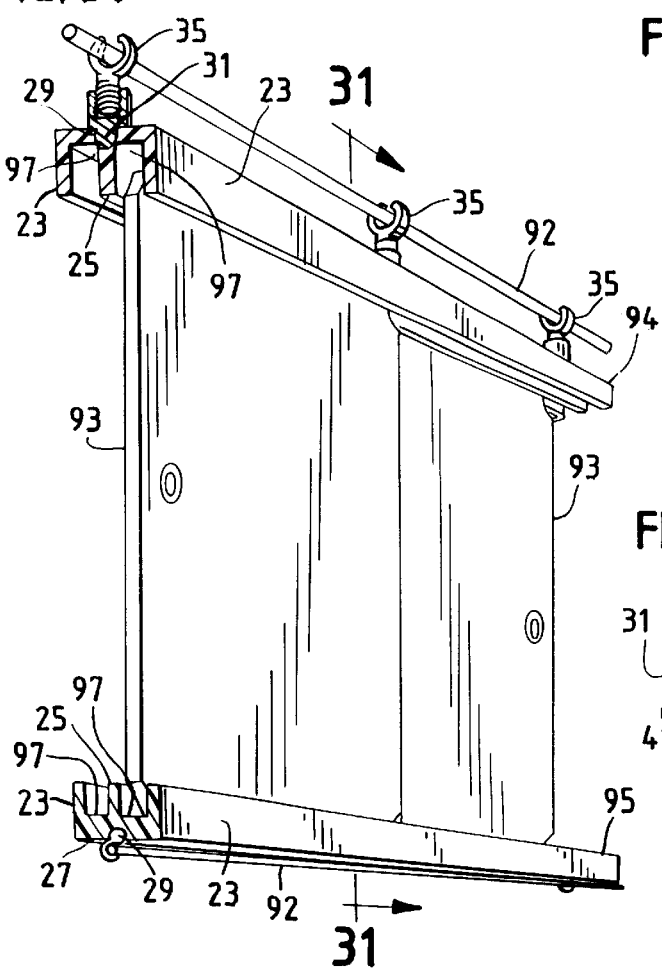
FIG. 30
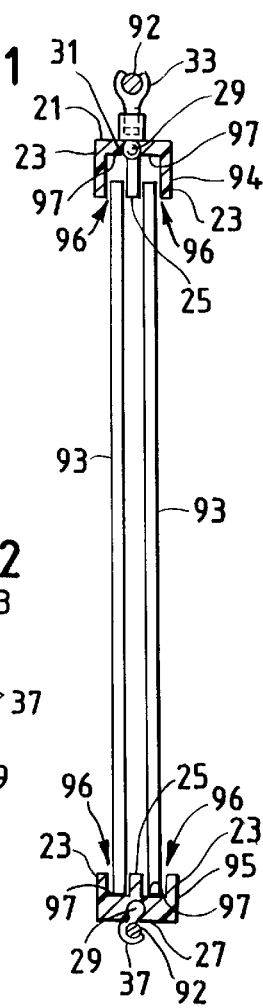
FIG. 31
FIG. 32

ENCLOSURE SYSTEM FOR A WIRE SHELF STRUCTURE

BACKGROUND OF THE INVENTION

This invention relates to an enclosure system, for a wire shelf structure, that includes a generally rectangular resilient flat panel that snaps into the side openings of the wire shelf structure without tools and generally without the need for fasteners.

The instant invention provides uniquely designed enclosing panels for a variety of wire shelving systems which improve existing designs of wire shelf units by optionally enclosing openings, including the sides, back and front of the unit. The snap-in panels are easily applied in minutes without tools. The panels are held on each side when the lower end is inserted behind the wire on the top of the lower shelf then the top of the panel can be flexed (bent) under the lower wire of upper shelf and it snaps into place as it resiliently flattens.

Snap-in panels will create a finished look to shelf units which enables a multitude of convertible designs to improve the decor when used in home, office, commercial or industrial use. The snap-in panels allow the snake like design of the peripheral support members to remain visible creating an attractive enclosed unit.

Alternative technology is available in the form of U.S. Pat. No. 5,768,722 issued in 1998 to Olson for a tent-like structure to partially enshroud the space between the upper and lower mattress of a bunk bed having a plurality of grommets that are disposed along at least one peripheral edge with tie connections.

U.S. Pat. No. 4,359,792 issued to Dale in 1992 discloses a crib having a canopy which has sections that can be pivoted to an open position to obtain access to the crib.

U.S. Pat. No. 4,222,579 issued in 1980 to Frydendal for a movable cart with pivotally connected walls adapted to swing on a vertical access to offer unrestricted access when in an open position.

U.S. Pat. No. 5,390,803 issued to McAllister in 1995 discloses a reinforced shelf mountable to space apart vertical support posts and U.S. Pat. No. 4,550,956 issued to Cohen et.al. in 1985 for a surgical case cart having a closed container supported on a chassis.

The principal disadvantage of the foregoing devices is its cost and the need for tools and fasteners for installation. The coverings become permanent and cannot be easily arranged to vary the aesthetic look of the unit nor the functional features which result from being able to interchange some or all of the openings with enclosing panels or rotatable panels.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

Unlike devices which teach structures that merely cover the wire shelving openings with fabric, the instant invention allows resilient panels to be snapped into place to cover and contain articles and objects stored on the shelves. The ability to snap panels into place without tools and substantially without auxiliary fasteners is a major advantage over the existing state of the art.

The snap-in panels provide an enclosed unit to store many objects and at the same time covering up for a clean look with optimum coverage of units. The panels of the present invention are portable, reusable, and easily transported. The varied use of these enclosing panels, which are easily converted from one like opening to another, will inevitably provide additional uses of the shelving units. This improved shelf system can be used when enclosed as: work area, clean space, bars, tables, dressers, kitchen carts—serving units; entertainment units, filing cabinets, and as a desk. The current invention will enable open modular units to be enclosed for a multitude of uses in various spaces.

The snap-in panels can be used in new and consumer used units. Allowing the consumer to apply the panels to their existing units for a useful new looking and updated unit is particularly advantageous.

Additionally, the enclosing panels will give optimal support to provide the shelving unit with more strength. When objects fall on a panel the panel will stay in place.

Various colors and designs of the panels enable units to coordinate where used. Various sizes of panels can be made available to fit most needs.

Still other advantages will be apparent from the disclosure that follows.

SUMMARY OF THE INVENTION

The invention relates to an enclosure system, for a wire shelf structure having at least two horizontal shelves with peripheral support members, with the horizontal shelves being mounted to spaced apart vertical posts by means for mounting, and wherein each of a plurality of enclosable openings of the wire shelf structure is circumscribed by adjacent spaced apart vertical posts and a corresponding section of the peripheral support members of each of two horizontal shelves disposed between the posts, comprising at least one generally rectangular resilient flat panel.

Each at least one panel is adapted for enclosing one of the plurality of enclosable openings. The at least one panel has a first transverse dimension parallel to a first edge of the panel that is greater than a first corresponding transverse dimension of the one of the plurality of enclosable openings, and a second transverse dimension that does not substantially exceed a second corresponding transverse dimension of the one of the plurality of enclosable openings, which is parallel to a second edge of the panel and perpendicular to the first transverse dimension.

The at least one of the plurality of enclosable openings of the wire shelf structure is circumscribed by adjacent spaced apart vertical posts and a corresponding section of the peripheral support members of each of two horizontal shelves disposed between the posts. The horizontal distance between such adjacent spaced apart vertical posts is measured from the closest points, that is, from the proximate edge thereof.

The at least one of the plurality of enclosable openings of the wire shelf structure can be substantially enclosed. By flexibly bending the at least one panel about a line perpendicular to the first transverse dimension to allow the distance between a first pair of opposite edges of the panel to be less by a predetermined amount than the first corresponding transverse dimension of the one of the plurality of enclosable openings, by inserting the respective opposite edges of the panel that is flexibly bent into the one of the plurality of enclosable openings, and by then allowing the panel to resiliently substantially flatten with the opposite edges secured respectively by corresponding opposed edges of the one of the plurality of enclosable openings of the wire shelf structure the object can be achieved. The entire procedure may be reversed to remove the at least one panel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Preferred embodiments of the invention are described hereinafter with reference to the accompanying drawing wherein:

FIG. 1 is an exploded perspective view of a wire shelf structure of the present invention with exploded away panels that are adapted for enclosing a plurality of enclosable openings;

FIG. 2 is a fragmentary cut away perspective view of said wire shelving structure of the present invention showing two of the panels disposed in an enclosing position with each of said panels having an upper edge and a lower edge, each of which is secured respectively by corresponding opposing edges of an enclosable opening of the wire structure;

FIG. 3 is a top plan view taken along the line of 3—3 of FIG. 2 of the wire shelf structure of the present invention showing each panel with beveled side edges that make tangential contact with a vertical post;

FIG. 4 is a side elevation view taken along the line of 4—4 of FIG. 2 of the wire shelf structure of the present invention showing the lower edge of the panel disposed inside of an opposed edge of the opening;

FIG. 5 is a perspective view of a corner of a panel of the present invention showing a recessed corner, said recess comprising an inverted arc;

FIG. 6 is a perspective view of a corner of a panel of the present invention showing a recessed corner, said recess comprising a notch;

FIG. 7 is a partial perspective view of a wire shelf structure used with the present invention showing a flexibly bending panel in phantom being inserted into an enclosable opening of the wire shelf structure and said panel is further shown in an enclosing position;

FIG. 8 is a fragmentary perspective view of the wire shelf structure showing a panel of the present invention with a recessed corner disposed in an enclosing position using a plurality of flexible cords joined at the end holding said panel in place;

FIG. 9 is a perspective view of the wire shelf structure with another preferred embodiment of the present invention showing a rotatable panel disposed on the front face of the structure in an enclosing position and further, in phantom, showing said rotating panel in an unrestricting position;

FIG. 10 is a fragmentary perspective view of the wire shelf for use with the present invention showing a portion of the peripheral support member having a lead wire with an elongated resilient wire cover having a cut along its length covering the lead wire, and further showing, in phantom, said wire cover exploded away from the lead wire;

FIG. 11 is a side elevation view showing the lead wire with the wire cover covering same and, in phantom, a rotatable panel in contact therewith;

FIG. 12 shows an alternative post fastener for connecting the panel to a vertical post which may be employed when the wire shelving structure is askew;

FIG. 13 is a prior art hook fastener;

FIG. 14 is a prior art hook fastener with locking mechanism;

FIG. 15 is a prior art grommet for connecting to the panel a flexible cord disposed therein for use as a handle;

FIG. 16 is a fragmentary perspective view of a closable ring interconnecting the peripheral support member to an enclosed panel, which may be rotatable;

FIG. 17 is a fragmentary perspective view of the wire shelf structure of the present invention with another preferred embodiment being a rectangular enclosing panel disposed in an enclosing position, and with said panel, shown in phantom, exploded away;

FIG. 18 is a fragmentary side elevation view of the wire shelf structure showing a peripheral support member supported by a vertical post with the enclosing panel of the present invention of FIG. 17 shown in an enclosing position;

FIG. 19 is a side elevation view of the wire shelf structure taken along the line 19—19 of FIG. 17 showing a lead wire of the peripheral support member covered by the wire cover that is in contact with the enclosing panel to bias against movement;

FIG. 20 is a side elevation view of a preferred embodiment showing a rectangular resilient flat panel comprising a frame having corner recesses and fabric like material tautly disposed thereon;

FIG. 21 is another preferred embodiment of a panel comprising a frame for use with a fabric like material that is substantially rectangular with corner gaps which provide opened recessed corners to allow the panel to attach to the wire shelf system in an unobtrusive manner;

FIG. 24 is a partial perspective view of a wire shelf structure of the present invention showing a rotatable panel disposed in an enclosable opening and a plurality of split vinyl tubes (i.e. wire covers) disposed on a horizontal shelf wire to which can be used to stabilize the enclosing panel.

FIG. 25 is a side elevation view of the wire shelf structure of the present invention taken along the line 25—25 of FIG. 24.

FIG. 29 is an exploded perspective view of the wire shelf structure of the present invention showing a track system and panels therefor exploded away from an enclosable opening;

FIG. 30 is a perspective view of the wire shelf of the present invention showing the relationship between the slidable panels and the track system;

FIG. 31 is a side elevation view of a wire shelf structure of the present invention taken along the line of 31—31 of FIG. 30; and FIG. 32 is a side elevation view of a second snap fastener of the wire shelf structure of the present invention.

DETAILED DESCRIPTION OF THE INVENTION

Figure 22:
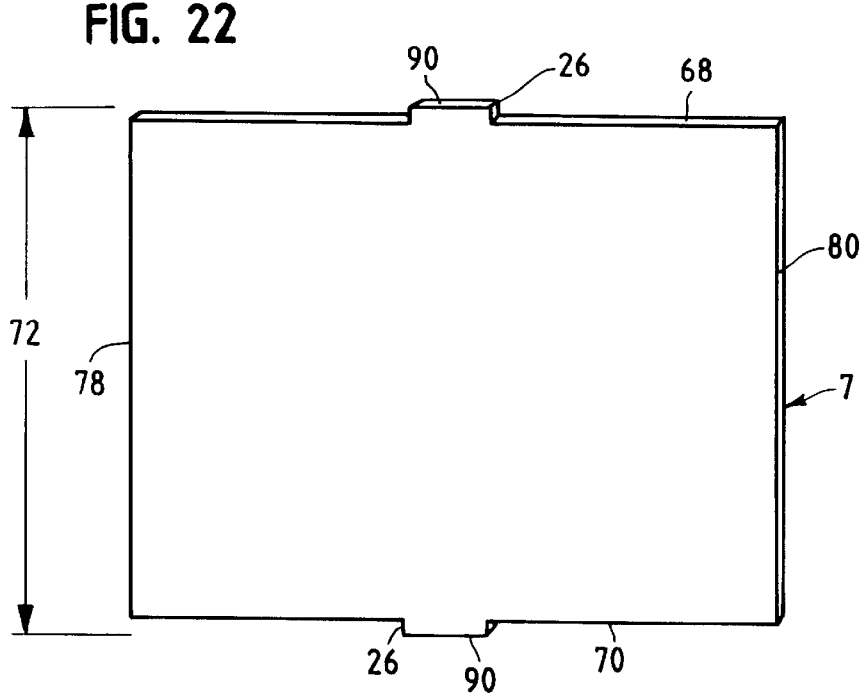
FIG. 22 is perspective view of another preferred embodiment of the panel showing a generally rectangular configuration with an upwardly extending vertical nub and a downwardly extending vertical nub.

The preferred embodiments depicted in the drawing comprise an enclosure system, for a wire shelf structure having at least two horizontal shelves with peripheral support members, with the horizontal shelves being mounted to spaced apart vertical posts by means for mounting, and wherein each of a plurality of enclosable openings of the wire shelf structure is circumscribed by adjacent spaced apart vertical posts and a corresponding section of the peripheral support members of each of two horizontal shelves disposed between the posts, comprising at least one generally rectangular resilient flat panel.

Without departing from the generality of the invention disclosed herein and without limiting the scope of the invention, the discussion that follows, will refer to the invention as depicted in the drawing.

The preferred embodiments of the apparatus depicted in the drawing comprise a new enclosure system for a wire shelf structure.

Referring to FIG. 1, each at least one panel 7 is adapted for enclosing one of the plurality of enclosable openings 6. The at least one panel 7 has a first transverse dimension 12 parallel to a first edge 14 of the panel 7 that is greater than a first corresponding transverse dimension 16 of the one of the plurality of enclosable openings 6, and a second transverse dimension 18 that does not substantially exceed a second corresponding transverse dimension 20 of the one of the plurality of enclosable openings 6, which is parallel to a second edge 34 of the panel 7 and perpendicular to the first transverse dimension 12. (For convenience, the first transverse dimension has been indicated as being vertical in FIG. 1. Clearly, this illustration is not intended to be limiting as said first transverse dimension could alternatively be horizontal as well, and such breath of scope is intended.)

As best shown in FIG. 7, the at least one of the plurality of enclosable openings 6 of the wire shelf structure 2 can be substantially enclosed by flexibly bending the at least one panel 7 about a line perpendicular to the first transverse dimension 12 to allow the distance between a first pair of opposite edges 36 of the panel 7 to be less by a predetermined amount than the first corresponding transverse dimension 16 of the one of the plurality of enclosable openings 6, by inserting the respective opposite edges 36 of the panel 7 that is flexibly bent into the one of the plurality of enclosable openings 6, and by then allowing the panel 7 to resiliently substantially flatten with the opposite edges 36 secured respectively by corresponding opposed edges 38 of the one of the plurality of enclosable openings 6 of the wire shelf structure, and the entire procedure may be reversed to remove the at least one panel 7.

As illustrated in the drawing, the peripheral support member extends vertically above and below a horizontal plane passing through the horizontal shelf of which it is a part. Particularly because the peripheral support member extends for a predetermined distance below such plane and yet said peripheral support member forms the boundary of the opening, that a panel that has a transverse dimension greater than a corresponding transverse dimension of the opening may be inserted into the opening with an edge disposed adjacent to said peripheral support member allowing an opposite edge of the panel to clear the peripheral support member of an adjacent shelf. These peripheral support members partially secure the panel in an enclosing position.

Preferably, the enclosure system of the current invention includes at least one rotatable flat panel 8 that has an upper edge 40 and a lower edge 42, and means for rotatably securing 44 the at least one rotatable flat panel 8 to a border 6a of another one of the plurality of enclosable openings 6. This rotating door 8 can be rotated about the border 6a of the another one of the plurality of enclosable openings 6 from an enclosing position, as shown in FIG. 9 for both front face panels, to an unrestricting position, shown in FIG. 9 in phantom. Furthermore, referring to FIG. 9, the at least one rotatable flat panel 8 that may have a plurality of holes 46 disposed proximate to the upper edge 40 to accommodate various connection means. FIGS. 13 and 14 show existing prior art fasteners that can be employed here to maintain a rotated panel in an open position. Furthermore, FIG. 12 shows a post fastener 86 that may be used to attach an enclosing panel, particularly where the wire shelf structure is askew. The post fastener will adhere to a panel from behind with double adhesive tape.

Preferably, the at least one rotatable panel 8 has a height when disposed in a vertical position that is not substantially greater than a second corresponding transverse dimension 48 of the another one of the plurality of enclosable openings 6, and a width that is less by a predetermined amount than the distance between the centerlines of the adjacent spaced apart vertical posts, which posts partially circumscribe the another one of the plurality of enclosable openings. The another one of the plurality of enclosable openings 6 of the wire shelf structure 2 can be substantially enclosed by rotatably disposing the at least one rotatable panel in the enclosing position.

The means for rotatably securing 44 the at least one rotatable panel may comprise one of a closable ring 50, as shown in FIG. 16, and a flexible cord 52 having two ends which are connected together to form a closed loop, as shown in FIG. 8. In addition, the rotatable panel 8 may have a handle means 54 disposed proximate to the lower edge 42 of the at least one rotatable flat panel 8. Obviously, the arrangement with the rotatable panel rotating about an upper border with the handle means on the bottom could be changed to equivalent arrangements with the rotation occurring about a bottom or side border and the handle means on the top or an opposite side respectively.

Moreover, the wire shelf structure 2 may have a front face 32 and at least one intervening horizontal shelf 3 disposed between the two horizontal shelves 3. The intervening horizontal shelf has a lead wire 24 extending outwardly from the front face 32 of the wire shelf structure 2, into the another one of the plurality of enclosable openings 6 and away from the intervening horizontal shelf 3. The enclosure system may have an elongated resilient wire cover 22 having a cut 23 along its length. The wire cover 22 is adapted for covering at least a portion of the lead wire 24 to provide a cushioning effect for the at least one rotatable panel 8 rotatably disposed in the enclosing position. Split clear vinyl tubing may be used and placed behind panel on lower shelf to provide additional support.

The panels of the instant invention are preferably made of PVC, but may be constructed on any material suited to the purpose, such as wood, metal, including stainless steel, plastic, Lucite, Formica, various laminates, or the like.

In a preferred embodiment of the enclosure system of this important invention shown in FIGS. 20 and 21, the at least one rectangular resilient panel 7 comprises a frame 28 having interconnected elements disposed along at least a portion of the first edge 14 and the second edge 34 of the panel 7, and a fabric 30 tautly disposed on the frame 28, which may include the frame 28 having a generally rectangular peripheral edge with recessed corners, as shown in FIG. 20. Note that a fabric 30 tautly arranged on frame 28 of FIG. 21 could readily achieve the preferred recessed corners as well.

The frame will preferably have interconnected elements disposed along at least a portion of the upper edge and the lower edge of the rotatable panel, and a fabric tautly disposed on the frame.

Preferably, the frame has a generally rectangular peripheral edge with recessed corners. In the embodiment shown in FIG. 21, the frame 28 has a first elongated rod 56 having a length that is less by a predetermined amount than the length of the upper edge of the rotatable panel, a second elongated rod 58 having a length that is less by a predetermined amount than the length of the lower edge of the rotatable panel, a third elongated rod 60 having a length that is less by a predetermined amount than the length of a first side edge of the rotatable panel, a fourth elongated rod 62 having a length that is less by a predetermined amount than the length of a second side edge of the rotatable panel, and means for interconnecting 66 the rods to dispose the first elongated rod 56 along a central portion of the upper edge of the rotatable panel, the second elongated rod 58 along a central portion of the lower edge of the rotatable panel, the third elongated rod 60 along a central portion of a first side edge of the rotatable panel, and the fourth elongated rod 62 along a central portion of a second side edge of the rotatable panel 8.

Another preferred aspect of the enclosure system of the present invention, where the wire shelf structure has at least one of the plurality of enclosable openings of the wire shelf structure is circumscribed by adjacent spaced apart vertical posts and a corresponding section of the peripheral support members of each of two adjacent horizontal shelves disposed between the posts, includes the at least one panel 7 generally having a height when disposed in a vertical position that is less by a predetermined amount than the distance between the peripheral support members 4 of one of the two adjacent horizontal shelves 3 and the peripheral support member 4 of the other of the two adjacent of the plurality of horizontal shelves 3.

Figure 23:
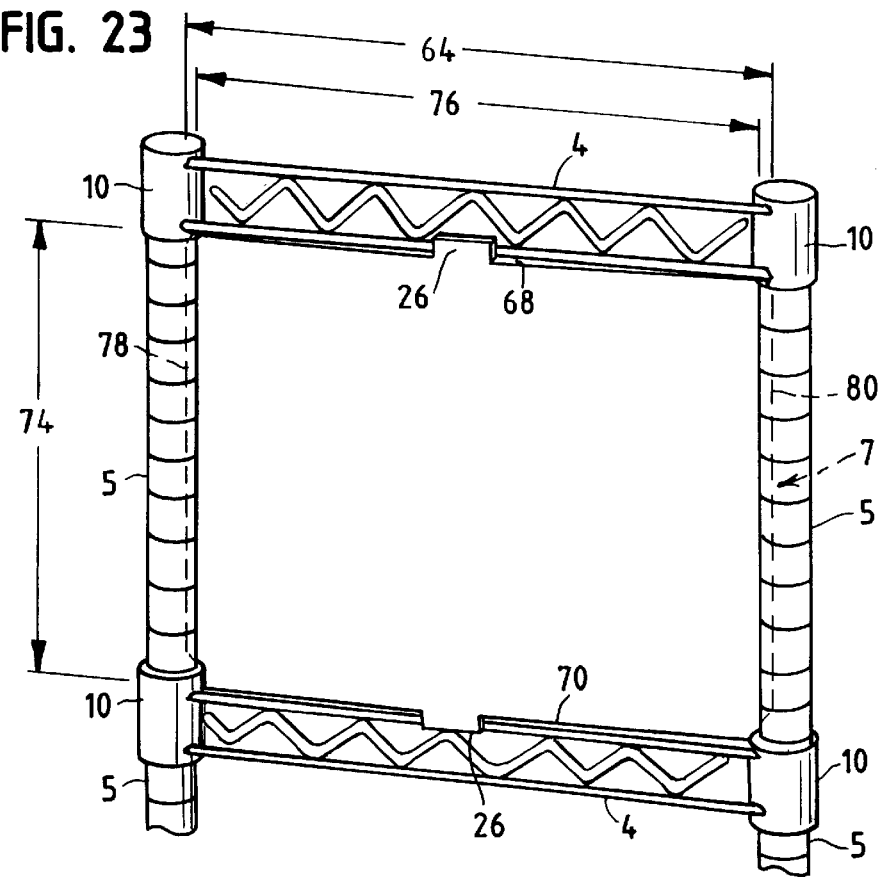
FIG. 23 is a perspective view of an opening of the wire shelf structure of the present invention with the panel shown in FIG. 21 disposed in an enclosing position.

In another preferred embodiment, as shown in FIGS. 22 and 23, the at least one panel 7 has an upper edge 68 and a lower edge 70, each of which is generally horizontal with a vertically extending centrally disposed nub 26, and a transverse dimension 72 passing through each of the centrally disposed nubs 26 that is greater by a predetermined amount than the distance between the peripheral support members of one of the two adjacent horizontal shelves and the peripheral support members of the other of the two adjacent of the plurality of horizontal shelves (said distance shown in FIG. 23 as number 74), and the at least one panel having a width 64 that is greater by a predetermined amount than the distance between a first proximate edge of one of the adjacent spaced apart vertical posts and a second proximate edge of the other adjacent spaced apart vertical posts (distance identified as number 76 in FIG. 23), which posts partially circumscribe the at least one of the plurality of enclosable openings 6. It will be apparent to those skilled in the art that the width of the nub is only limited by the preferred requirement that when the panel is disposed in an enclosing position that the panel bending contact with the means for mounting be reduced. Thus, each of the nubs could extend along a substantial portion of their respective upper and lower edges.

In the embodiments of the invention shown in FIGS. 22–23 and 26–27, respectively, means for stabilizing 90 the panel 7 is provided. The at least one of the plurality of enclosable openings of the wire shelf structure can be substantially enclosed by inserting the respective side edges 78,80 of the panel 7,7b into the opening, bracing central portions of the upper edge and lower edge respectively with the means for stabilizing 90, and by then allowing the respective side edges of the panel to be secured by the respective adjacent spaced vertical posts 5.

Preferably, as shown in FIGS. 22–23, the means for stabilizing 90 the panel comprises a vertically extending centrally disposed nub 26 on each of an upper edge and a lower edge of the panel 7 with a vertical dimension passing through each of the centrally disposed nubs that is greater by a predetermined amount than the distance between the peripheral support members of one of the two adjacent horizontal shelves and the peripheral support members of the other of the two adjacent of the plurality of horizontal shelves.

In this way, the at least one of the plurality of enclosable openings of the wire shelf structure can be substantially enclosed by flexibly bending the panel about a vertical line to allow the distance between a first side edge and a second side edge of the panel to be less by a predetermined amount than the distance between the proximate edge of one of the adjacent spaced apart vertical posts and the proximate edge of the other adjacent spaced apart vertical posts, by inserting the respective side edges of the panel that is flexibly bent into the one of the plurality of enclosable openings, and by then allowing the panel to resiliently substantially flatten with the side edges secured by the respective adjacent spaced vertical posts.

Figure 26:
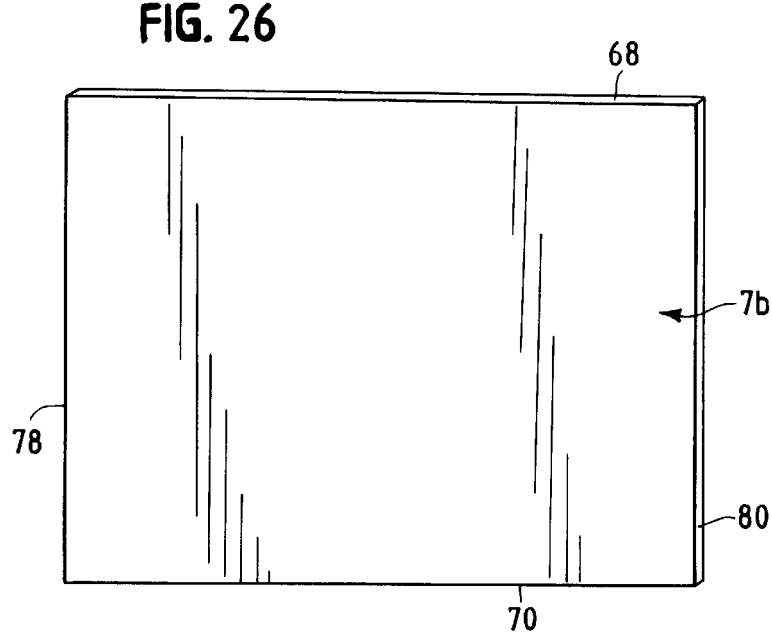
FIG. 26 is a perspective view of another preferred embodiment of the wire shelf structure of the present invention showing a generally rectangular configuration of the panel.
Figure 27:
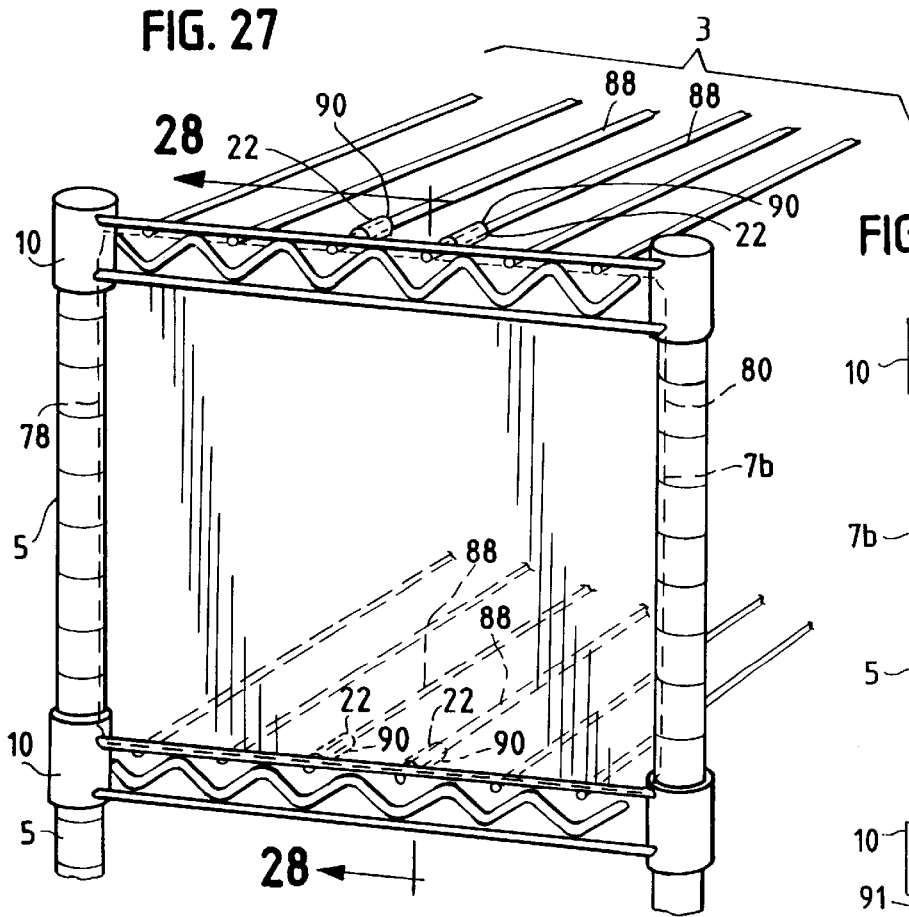
FIG. 27 is a perspective view of an opening wire shelf structure with the panel of the wire shelf structure of the FIG. 26 disposed in an enclosing position and with the plurality of wire covers disposed on central wires of the horizontal shelf to secure said panel.
Figure 28:
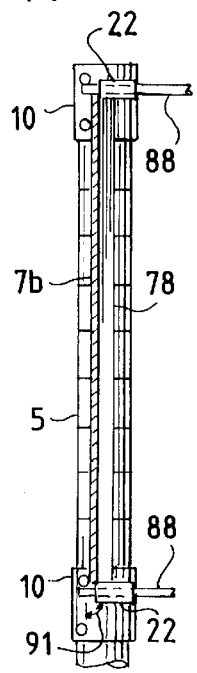
FIG. 28 is a side elevation view taken along the line 28—28 of FIG. 27 of the wire shelf structure of the present invention.

Alternatively, as shown in FIGS. 26–27, the means for stabilizing 90 the panel 7b may comprise a plurality of wire covers comprising split vinyl tubes 22 with at least one of the plurality of split vinyl tubes disposed on a central wire 88 of each of the two adjacent horizontal shelves 3 at a spaced distance 91 from the corresponding peripheral support member 4 of the opening. The spaced distance is sufficient for the edge of the panel to be disposed between the split vinyl tube and the corresponding peripheral support member, as best shown in FIG. 28.

The at least one of the plurality of enclosable openings of the wire shelf structure can be substantially enclosed by flexibly bending the panel about a vertical line to allow the distance between a first side edge and a second side edge of the panel to be less by a predetermined amount than the distance 76 between the proximate edge of one of the adjacent spaced apart vertical posts and the proximate edge of the other adjacent spaced apart vertical posts, which posts partially circumscribe the at least one of the plurality of enclosable openings, by inserting the respective side edges (78 and 80, respectively) of the panel 7 that is flexibly bent into the one of the plurality of enclosable openings, and by then allowing the panel to resiliently substantially flatten with the side edges secured by the respective adjacent spaced vertical posts.

As shown in FIG. 1, the at least one panel may further have a height 12 when disposed in a vertical position that is greater by a predetermined amount than the distance 16 between the peripheral support members 4 of one of the two horizontal shelves 3 and the peripheral support members 4 of the other of the two horizontal shelves 3, and the at least one panel may have a width 18 that is less by a predetermined amount than the distance 20 between a first proximate edge of one of the adjacent spaced apart vertical posts and a second proximate edge thereof. These posts 5 partially circumscribe the one of the plurality of enclosable openings 6.

In this way, the one of the plurality of enclosable openings of the wire shelf structure can be substantially enclosed by flexibly bending the panel about a horizontal line to allow the distance between an upper edge and a lower edge of the panel to be less by a predetermined amount than the distance between the peripheral support members of one of the two horizontal shelves and the peripheral support members of the other of the two horizontal shelves, by inserting the respective upper and lower edges of the panel that is flexibly bent into the one of the plurality of enclosable openings, and then by allowing the panel to resiliently substantially flatten with the upper and lower edges secured by the respective peripheral support members of the wire shelf structure and the entire procedure may be reversed to remove the enclosing panel.

Additionally, referring to FIGS. 9–11, where the wire shelf structure has a front face 32 and an intervening horizontal shelf 3 disposed between the two horizontal shelves 3, with the intervening horizontal shelf has a lead wire 24 extending outwardly from the front face 32, into the one of the plurality of enclosable openings 6 and away from the intervening horizontal shelf, the enclosure system may further comprise an elongated resilient wire cover 22 having a cut 23 along its length, as shown in FIG. 10. The wire cover is adapted for covering at least a portion of the lead wire, as shown in FIG. 11, to provide a cushioning effect for the at least one panel disposed in an the enclosing position, and for biasing the at least one panel that has resiliently substantially flattened from normal movement while enclosing the one of the plurality of enclosable openings, as shown in FIG. 19.

In another preferred embodiment of the enclosure system, for a wire shelf structure having at least two horizontal shelves with peripheral support members, with the horizontal shelves is mounted to spaced apart vertical posts by means for mounting, and wherein each of a plurality of enclosable openings of the wire shelf structure is circumscribed by spaced apart vertical posts and a corresponding section of the peripheral support members of each of two horizontal shelves disposed between the posts, the invention comprises at least one generally rectangular resilient flat panel. Each at least one panel is adapted for enclosing one of the plurality of enclosable openings. The at least one panel has a height when disposed in a vertical position that is greater by a predetermined amount than the distance (16, in FIG. 7) between the peripheral support members of one of the two horizontal shelves and the peripheral support members of the other of the two horizontal shelves, and the panel has a width that is less by a predetermined amount than the distance between a first remote edge 82 of one of the adjacent spaced apart vertical posts and a second remote edge 84 of the other one of the adjacent spaced apart vertical posts. (See FIG. 1.)

The at least one panel has recessed corners 9 that are suitably sized to allow the at least one panel to substantially enclose the one of the plurality of enclosable openings independent of bending contact with the means for mounting 10. Thus, the at least one of the plurality of enclosable openings of the wire shelf structure can be substantially enclosed by flexibly bending the panel about a horizontal line to allow the distance between an upper edge and a lower edge of the panel to be less by a predetermined amount than the distance between the peripheral support members of one of the two adjacent horizontal shelves and the peripheral support members of the other of the two adjacent horizontal shelves, by inserting the respective upper and lower edges of the panel that is flexibly bent into the one of the plurality of enclosable openings, and then by allowing the panel to resiliently substantially flatten with the upper and lower edges secured by the respective peripheral support members of the wire shelf structure, and the entire procedure may be reversed to remove the enclosing panel. The side edges of a recessed panel serve as a nub in contacting the adjacent posts.

Additionally, the at least one panel may have a width that is less by a predetermined amount than the distance between the centerlines of the adjacent spaced apart vertical posts which partially circumscribe the one of the plurality of enclosable openings to allow the at least one panel to lie unobtrusively in a vertical plane which passes through the adjacent spaced apart vertical posts. Moreover, the at least one panel may have a first side edge 78 and a second side edge 80, and the first side edge and the second side edge are beveled, as shown in FIG. 3, so that each beveled face of the respective side edges can make a generally tangential contact with one of the adjacent spaced apart vertical posts.

For a wire shelf structure where each of the plurality of enclosable openings of the wire shelf structure is circumscribed by spaced apart vertical posts and a corresponding section of the peripheral support members of each of two adjacent horizontal shelves disposed between the posts, preferably the at least one panel 7 has recessed corners 9 that are suitably sized to allow the at least one panel to substantially enclose the one of the plurality of enclosable openings 6 independent of bending contact with the means for mounting 10. In this way, the at least one panel substantially encloses the one of the plurality of enclosable openings while lying unobtrusively in a vertical plane which passes through the adjacent spaced apart vertical posts, as illustrated in FIGS. 2 and 3.

Another preferred embodiment of the enclosure system of the present invention, for a wire shelf structure having at least two horizontal shelves with peripheral support members, with the horizontal shelves is mounted to spaced apart vertical posts by means for mounting, and wherein each of a plurality of enclosable openings of the wire shelf structure is circumscribed by two horizontal shelves and adjacent spaced apart vertical posts, the elements include at least one generally rectangular resilient flat panel 7 that is adapted for enclosing one of the plurality of enclosable openings 6.

The at least one panel 7 has a height when disposed in a vertical position that is greater by a predetermined amount than the distance between the peripheral support members of one of the two horizontal shelves and the peripheral support members of the other of the two horizontal shelves, and the panel has a width that is not substantially greater by a predetermined amount than the distance between a first remote edge 82 of the adjacent spaced apart vertical posts and a second remote edge 84 of the adjacent spaced apart vertical posts, which partially circumscribe the one of the plurality of enclosable openings.

The panel further has recessed corners 9 that are suitably sized to allow the panel 7 to substantially enclose the one of the plurality of enclosable openings 6 independent of bending contact with the means for mounting. As is illustrated in FIG. 7, the one of the plurality of enclosable openings of the wire shelf structure can be enclosed by flexibly bending the panel about a horizontal line to allow the distance between an upper edge and a lower edge of the panel to be less by a predetermined amount than the distance between the peripheral support members of one of the two horizontal shelves and the peripheral support members of the other of the two horizontal shelves, by inserting the respective upper and lower edges of the panel that is flexibly bent into the one of the plurality of enclosable openings, and then by allowing the panel to resiliently substantially flatten with the upper and lower edges secured by the respective peripheral support members of the wire shelf structure, and the entire procedure may be reversed to remove the enclosing panel.

Preferably, each of the recessed corners of the panel comprises an inverted arc, as shown in FIG. 5. Alternatively, each of the recessed corners of the panel could comprise a notch, like the one shown in FIG. 6, having an approximate 45 degree angle from each side edge of the panel. Obviously, any other equivalent recess at the corner could be employed.

For a wire shelf structure having a front face 32 and at least two horizontal shelves 3 with peripheral support members 4, an intervening horizontal shelf disposed between the two horizontal shelves 3, with the horizontal shelves mounted to spaced apart vertical posts 5 by means for mounting 10, where each of a plurality of enclosable openings of the wire shelf structure is circumscribed by two adjacent spaced apart vertical posts and a corresponding section of the peripheral support members of each of the two horizontal shelves disposed between the posts, with the intervening horizontal shelf having a lead wire 24 extending outwardly from the front face into another one of the plurality of enclosable openings 6 and away from the intervening horizontal shelf, another preferred embodiment of the enclosure system of the present invention comprises at least one generally rectangular resilient flat panel 7, at least one rotatable flat panel 8 that has an upper edge and a lower edge, means for rotatably securing 44 the at least one rotatable flat panel 8, and an elongated resilient wire cover 22 having a cut 23 along its length.

Each said at least one panel 7 is adapted for enclosing one of plurality of enclosable openings 6. The panel has a height when disposed in a vertical position that is less by a predetermined amount than the distance between the respective horizontal planes of the two horizontal shelves which partially circumscribe the one of a plurality of enclosable openings. Furthermore, the height is greater by a predetermined amount than the distance between the horizontal plane of one of the two horizontal shelves 3 and the peripheral support members 4 of the other of the two horizontal shelves 3.

The panel also has a width that is less by a predetermined amount than the distance between the centerlines of the adjacent spaced apart vertical posts 5, and recessed corners 9 that are suitably sized to allow the panel to substantially enclose the one of a plurality of enclosable openings independent of bending contact with the means for mounting 10.

The at least one rotatable flat panel 8 has an upper edge and a lower edge, and the means for rotatably securing 44 attaches the at least one rotatable flat panel to a border of another one of the plurality of enclosable openings. Additionally, the wire cover 22 is adapted for covering at least a portion of the lead wire 24 to provide a cushioning effect for the at least one rotatable panel 8 rotatably disposed in an the enclosing position.

Again, as illustrated in FIG. 7 of the drawing, the one of the plurality of enclosable openings of the wire shelf structure can be enclosed by flexibly bending the panel about a horizontal line to allow the distance between an upper edge and a lower edge of the panel to be less by a predetermined amount than the distance between the horizontal plane of one of the two horizontal shelves and the peripheral support members of the other of the two horizontal shelves, and inserting the respective upper and lower edges of the panel that is flexibly bent in to the one of the plurality of enclosable openings and then allowing the panel to resiliently substantially flatten with the upper and lower edges secured by the respective peripheral support members of the wire shelf structure, and the entire procedure may be reversed to remove the enclosing panel.

In another preferred embodiment of the enclosure system of the present invention, for use with a wire shelf structure having at least two horizontal shelves with peripheral support members, with the horizontal shelves is mounted to spaced apart vertical posts by means for mounting, and wherein each of a plurality of enclosable openings of the wire shelf structure is circumscribed by adjacent spaced apart vertical posts and a corresponding section of the peripheral support members of each of two horizontal shelves disposed between the posts, the invention comprises at least one generally rectangular resilient flat panel 7.

Each at least one panel is adapted for enclosing one of the plurality of enclosable openings, and has a first transverse dimension 12 parallel to a first edge 14 of the panel 7 that is greater than a first corresponding transverse dimension 16 of the one of the plurality of enclosable openings 6, and a second transverse dimension 18 that does not substantially exceed a second corresponding transverse dimension 20 of the one of the plurality of enclosable openings, which is parallel to a second edge 34 of the panel and perpendicular to the first transverse dimension, as shown in FIG. 1. The at least one panel has recessed corners 9 that are suitably sized to allow the at least one panel to substantially enclose the one of the plurality of enclosable openings independent of bending contact with the means for mounting. At least one of the plurality of enclosable openings of the wire shelf structure can be substantially enclosed by flexibly bending the at least one panel about a line perpendicular to the first transverse dimension to allow the distance between a first pair of opposite edges of the panel to be less by a predetermined amount than the first corresponding transverse dimension of the one of the plurality of enclosable openings, by inserting the respective opposite edges of the panel that is flexibly bent into the one of the plurality of enclosable openings, and by then allowing the panel to resiliently substantially flatten with the opposite edges 36 secured respectively by corresponding opposed edges of the one of the plurality of enclosable openings of the wire shelf structure, and the entire procedure may be reversed to remove the at least one panel.

In another preferred embodiment of the enclosure system, as best shown in FIG. 17, the at least one panel 7 has a height when disposed in a vertical position that is greater by a predetermined amount than the distance between the peripheral support members 4 of one of the two horizontal shelves 3 and the peripheral support members 4 of the other of the two horizontal shelves 4. The at least one panel has a width that is less by a predetermined amount than the distance between a first proximate edge of one of the adjacent spaced apart vertical posts and a second proximate edge thereof, which posts partially circumscribe the one of the plurality of enclosable openings.

The one of the plurality of enclosable openings of the wire shelf structure can be substantially enclosed by flexibly bending the panel 7 about a horizontal line to allow the distance between an upper edge 68 and a lower edge 70 of the panel to be less by a predetermined amount than the distance between the peripheral support members of one of the two horizontal shelves and the peripheral support members of the other of the two horizontal shelves, by inserting the respective upper and lower edges of the panel that is flexibly bent into the one of the plurality of enclosable openings, and then by allowing the panel to resiliently substantially flatten with the upper and lower edges secured by the respective peripheral support members of the wire shelf structure and the entire procedure may be reversed to remove the enclosing panel.

In another preferred embodiment of the enclosure system, for a wire shelf structure having at least two horizontal shelves with peripheral support members, with the horizontal shelves being mounted to spaced apart vertical posts by means for mounting, and wherein each of a plurality of enclosable openings of the wire shelf structure is circumscribed by adjacent spaced apart vertical posts and a corresponding section of the peripheral support members of each of two horizontal shelves disposed between the posts, the invention comprises at least one generally rectangular flat panel, as shown in FIG. 1.

Referring to FIGS. 24–25 for a rotating panel 8, it will be obvious to one skilled in the art, that a non-rotating panel 7 may be used to enclosed an opening 6 in the same manner as that which is shown in the drawing for a rotating panel. Each at least one panel 7 is adapted for enclosing one of the plurality of enclosable openings 6. The at least one panel has a first transverse dimension 12 parallel to a first edge 14 of the panel that is greater than a first corresponding transverse dimension 16 of the one of the plurality of enclosable openings, and a second transverse dimension 18 that does not substantially exceed a second corresponding transverse dimension 20 of the one of the plurality of enclosable openings, which is parallel to a second edge 34 of the panel and perpendicular to the first transverse dimension 12.

The at least one of the plurality of enclosable openings of the wire shelf structure can be substantially enclosed by inserting the second edge 34 of the panel into the opening a predetermined distance, by inserting an opposite edge 36 of the panel into the opening, and allowing both the second edge 34 and the opposite edge 36 to be engaged respectively by corresponding opposed edges of the opening, and the entire procedure may be reversed to remove the panel.

Preferably, the at least one panel comprises recessed corners 9, that are suitably sized to allow the panel to substantially enclose the opening independent of bending contact with the means for mounting 10.

Another preferred embodiment of the at least one panel, as shown in FIG. 24, comprises at least one rotatable flat panel 8 that has an upper edge 40 and a lower edge 42, a plurality of holes 46 disposed proximate to the upper edge, a height when disposed in a vertical position that is not substantially greater than a corresponding transverse dimension of the opening, and a width that is less by a predetermined amount than the distance between the centerlines of the adjacent spaced apart vertical posts, which posts partially circumscribe the opening, and means for rotatably securing 44 the rotatable panel 8 to an upper border 6b of the opening are also provided.

In this way the at least one rotatable flat panel 8 can be rotated about the border 6a of the opening from an unrestricting position to an enclosing position, by inserting the upper edge 40 of the panel into the opening to the extent permitted by the means for rotatably securing 44, so that the lower edge 42 of the panel can be disposed in the opening, and the entire procedure may be reversed to remove the panel.

This invention may be adapted to provide the at least one panel having recessed corners 9 that are suitably sized to allow the panel to substantially enclose the opening independent of bending contact with the means for mounting 10.

Moreover, the recessed corners 9 disposed along the upper edge 40 of the rotatable panel 8 can be suitably sized to allow the upper edge of the panel to be inserted a predetermined distance into the opening, while the upper edge is generally parallel to an upper border 6b of the opening, so that the lower edge 42 of the panel can be inserted into the opening independent of contact with the corresponding section of the peripheral support members 4 disposed along a lower border of the opening.

Furthermore, as shown in FIG. 25, means for stabilizing 90 the panel including a plurality of split vinyl tubes (wire cover 22) with at least one of the plurality of split vinyl tubes disposed on a horizontal shelf wire 92 that extends away from the opening and at a spaced distance 91 from the corresponding peripheral support member of the opening can be included. The spaced distance is sufficient for the edge of the panel to be disposed between the split vinyl tube and the corresponding peripheral support member.

In the embodiment of the enclosure system shown in FIGS. 29–31, the at least one of the plurality of enclosable openings is circumscribed by adjacent spaced apart vertical posts and a corresponding section of the peripheral support members of each of two adjacent horizontal shelves disposed between the posts, and wherein the at least one panel comprises two generally rectangular panels 93, a track system having an upper channel 94 and a lower channel 95 between which the two panels 93 can be slidingly supported is provided.

Each channel has a pair of parallel elongated recesses 96 for receiving an edge of one of the two panels 93. Each recess has an innermost vertex 97. The upper channel 94 is attached to the underside 98 of one of the two adjacent horizontal shelves which is above the other of the two adjacent horizontal shelves, and the lower channel 95 is attached to the topside 99 of the other of the two adjacent horizontal shelves.

Each of the two panels has a height when disposed in a vertical position that is less by a predetermined amount than the distance between the respective vertices of the upper and lower channels. Each of the two panels has a width that does not substantially exceed half the distance between the centerline of one of the adjacent spaced apart vertical posts and the centerline of the other adjacent spaced apart vertical posts.

Whereby, each of the two panels can be slidingly disposed in the track system to enclose the at least one of the plurality of enclosable openings.

Preferably, the upper channel 94 has a top wall 21 and two substantially parallel sidewalls 23 and a center wall 25 which extend downwardly from the top wall. The lower channel 95 has a bottom wall 27 and two substantially parallel sidewalls 23 and a center wall 25 which extend upwardly from the bottom wall. Each of the top wall and the bottom wall has a plurality of holes 29 adapted for socketing a ball connector 31. It will be readily understood by one skilled in the art that in lieu of a plurality of holes adapted for socketing a ball connector, a plurality of holes adapted for a threaded bolt or screw, or equivalent, could be substituted therefor.

The track system may further comprise at least one first snap fastener 33 having an elongated body with a clip 35 disposed on one end and a ball connector 31 disposed on the other end. The clip is suitably sized to fasten to a horizontal shelf wire 92, and the ball connector 31 of the first snap fastener is suitably sized to fasten to one of the plurality of holes 29 of the upper channel 94.

Further provided is at least one second snap fastener 37 comprising a u-shaped clamp 39 with a handle, and a bolt 41 with a ball connector disposed on an end thereof and a head disposed on another end thereof. The handle has an aperture 43 suitably sized to allow the ball connector of the second snap fastener 37 to pass through and impede the passage of the head, as shown in FIG. 32.

As best shown in FIG. 31, the upper channel 94 is supported by the at least one first snap fastener 33 with the ball connector 31 thereof disposed in one of the plurality of holes 29 and the clip 35 being fastened to a horizontal shelf wire 92 of the one of the two adjacent horizontal shelves which is above the other of the two adjacent horizontal shelves, and the lower channel 95 is supported by the at least one second snap fastener 37 with the ball connector 31 thereof disposed in one of the plurality of holes 29 and the u-shaped clamp 39 that is attached to the other of the two adjacent horizontal shelves.

In this way, the track system is attached to the wire shelf structure and the two panels are slidingly disposed there between.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

My invention resides not in any one of these features per se, but rather in the particular combination of all of them herein disclosed and claimed and it is distinguished from the prior art in this particular combination of all of its structures for the function specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is a follows:

1. An enclosure system, for a wire shelf structure having at least two horizontal shelves with peripheral support members, with said horizontal shelves being mounted to spaced apart vertical posts by means for mounting, and wherein each of a plurality of enclosable openings of the wire shelf structure is circumscribed by adjacent spaced apart vertical posts and a corresponding section of the peripheral support members of each of two horizontal shelves disposed between said posts, comprising:

at least one generally rectangular resilient flat panel, each at least one panel being adapted for enclosing one of the plurality of enclosable openings, said at least one panel having a first transverse dimension parallel to a first edge of said panel that is greater than a first corresponding transverse dimension of said one of the plurality of enclosable openings, and a second transverse dimension that does not substantially exceed a second corresponding transverse dimension of said one of the plurality of enclosable openings, which is parallel to a second edge of said panel and perpendicular to the first transverse dimension, whereby, said at least one of the plurality of enclosable openings of the wire shelf structure can be substantially enclosed by flexibly bending the at least one panel about a line perpendicular to the first transverse dimension to allow the distance between a first pair of opposite edges of the panel to be less than the first corresponding transverse dimension of said one of the plurality of enclosable openings, by inserting the respective said opposite edges of the panel that is flexibly bent into said one of the plurality of enclosable openings, and by then allowing the panel to resiliently substantially flatten with said opposite edges secured respectively by corresponding opposed edges of said one of the plurality of enclosable openings of the wire shelf structure, and the entire procedure may be reversed to remove the at least one panel.

2. The enclosure system of claim 1, further comprising:
at least one rotatable flat panel that has an upper edge and a lower edge,
means for rotatably securing the at least one rotatable flat panel to a border of another one of the plurality of enclosable openings,
whereby, the at least one rotatable flat panel can be rotated about the border of said another one of the plurality of enclosable openings from an enclosing position to an unrestricting position.

3. The enclosure system of claim 2, wherein said at least one rotatable flat panel that has a plurality of holes disposed proximate to the upper edge.

4. The enclosure system of claim 3, wherein the at least one rotatable panel comprises a frame having interconnected elements disposed along at least a portion of the upper edge and the lower edge of said rotatable panel, and a fabric tautly disposed on said frame.

5. The enclosure system of claim 4, wherein the frame has a generally rectangular peripheral edge with recessed corners.

6. The enclosure system of claim 4, wherein the frame comprises:
a first elongated rod having a length that is less than the length of the upper edge of said rotatable panel,
a second elongated rod having a length that is less than the length of the lower edge of said rotatable panel,
a third elongated rod having a length that is less than the length of a first side edge of said rotatable panel,
a fourth elongated rod having a length that is less than the length of a second side edge of said rotatable panel, and
means for interconnecting said rods to dispose the first elongated rod along a central portion of the upper edge of said rotatable panel, the second elongated rod along a central portion of the lower edge of said rotatable panel, the third elongated rod along a central portion of a first side edge of said rotatable panel, and the fourth elongated rod along a central portion of a second side edge of said rotatable panel.

7. The enclosure system of claim 3, wherein said at least one rotatable panel has a height when disposed in a vertical position that is not substantially greater than a second corresponding transverse dimension of said another one of the plurality of enclosable openings, and a width that is less than the distance between the centerlines of the adjacent spaced apart vertical posts, which posts partially circumscribe said another one of the plurality of enclosable openings,
whereby, said another one of the plurality of enclosable openings of the wire shelf structure can be substantially enclosed by rotatably disposing said at least one rotatable panel in the enclosing position.

8. The enclosure system of claim 7, wherein the wire shelf structure has an intervening horizontal shelf disposed between said two horizontal shelves and a front face, said intervening horizontal shelf has a lead wire extending outwardly from the front face, into said another one of the plurality of enclosable openings and away from the intervening horizontal shelf, further comprises:
an elongated resilient wire cover having a cut along its length,
said wire cover being adapted for covering at least a portion of the lead wire to provide a cushioning effect for said at least one rotatable panel being rotatably disposed in an the enclosing position.

9. The enclosure system of claim 3, wherein means for rotatably securing said at least one rotatable panel comprises one of a closable ring and a flexible cord having two ends which are connected together to form a closed loop.

10. The enclosure system of claim 3, further comprising a handle means disposed proximate to the lower edge of the at least one rotatable flat panel.

11. The enclosure system of claim 1, wherein the at least one rectangular resilient panel comprises a frame having interconnected elements disposed along at least a portion of the first edge and the second edge of said panel, and a fabric tautly disposed on said frame.

12. The enclosure system of claim 11, wherein the frame has a generally rectangular peripheral edge with recessed corners.

13. The enclosure system of claim 1, wherein the at least one of the plurality of enclosable openings is circumscribed by adjacent spaced apart vertical posts and a corresponding section of the peripheral support members of each of two adjacent horizontal shelves disposed between said posts, and
wherein said at least one panel generally has a height when disposed in a vertical position that is less than the distance between the peripheral support members of one of said two adjacent horizontal shelves and the peripheral support member of the other of said two adjacent of said plurality of horizontal shelves,
said at least one panel having a width that is greater than the distance between a first proximate edge of one of the adjacent spaced apart vertical posts and a second proximate edge of the other adjacent spaced apart vertical posts, which posts partially circumscribe said at least one of the plurality of enclosable openings; and
further comprising a means for stabilizing the panel,
whereby, said at least one of the plurality of enclosable openings of the wire shelf structure can be substantially enclosed by inserting the respective side edges of the panel into said opening, bracing central portions of the upper edge and lower edge respectively with the means for stabilizing, and by then allowing the respective side edges of the panel to be secured by the respective adjacent spaced vertical posts.

14. The enclosure system of claim 13, wherein the means for stabilizing the panel comprises a vertically extending centrally disposed nub on each of an upper edge and a lower edge of the panel with a vertical dimension passing through each of said centrally disposed nubs that is greater than the distance between the peripheral support members of one of said two adjacent horizontal shelves and the peripheral support members of the other of said two adjacent of said plurality of horizontal shelves,
whereby, said at least one of the plurality of enclosable openings of the wire shelf structure can be substantially enclosed by flexibly bending said panel about a vertical line to allow the distance between a first side edge and a second side edge of the panel to be less than the distance between the proximate edge of one of the adjacent spaced apart vertical posts and the proximate edge of the other adjacent spaced apart vertical posts, which posts partially circumscribe the at least one of the plurality of enclosable openings, by inserting the respective side edges of the panel that is flexibly bent into said one of the plurality of enclosable openings, and by then allowing the panel to resiliently substantially flatten with said side edges secured by the respective adjacent spaced vertical posts.

15. The enclosure system of claim 14, wherein the means for stabilizing the panel comprises a plurality of split vinyl tubes with at least one of said plurality of split vinyl tubes disposed on a central wire of each of said two adjacent horizontal shelves at a spaced distance from the corresponding peripheral support member of said opening, said spaced distance being sufficient for the edge of the panel to be disposed between said split vinyl tube and said corresponding peripheral support member.

16. The enclosure system of claim 1, wherein said at least one panel has a height when disposed in a vertical position that is greater than the distance between the peripheral support members of one of said two horizontal shelves and the peripheral support members of the other of said two horizontal shelves, and said at least one panel has a width that is less than the distance between a first proximate edge of one of the adjacent spaced apart vertical posts and a second proximate edge thereof, which posts partially circumscribe said one of the plurality of enclosable openings, whereby, said one of the plurality of enclosable openings of the wire shelf structure can be substantially enclosed by flexibly bending the panel about a horizontal line to allow the distance between an upper edge and a lower edge of the panel to be less than the distance between the peripheral support members of one of said two horizontal shelves and the peripheral support members of the other of said two horizontal shelves, by inserting the respective upper and lower edges of the panel that is flexibly bent into said one of the plurality of enclosable openings, and then by allowing the panel to resiliently substantially flatten with said upper and lower edges secured by the respective peripheral support members of the wire shelf structure and the entire procedure may be reversed to remove the enclosing panel.

17. The enclosure system of claim 16, wherein the wire shelf structure has at least one horizontal shelf disposed between said two horizontal shelves and a front face, said intervening horizontal shelf has a lead wire extending outwardly from the front face, into said one of the plurality of enclosable openings and away from the intervening horizontal shelf, further comprises:

an elongated resilient wire cover having a cut along its length, said wire cover being adapted for covering at least a portion of the lead wire to provide a cushioning effect for said at least one panel being disposed in an the enclosing position, and for biasing said at least one panel that has resiliently substantially flattened from normal movement while enclosing said one of the plurality of enclosable openings.

18. The enclosure system of claim 16, for a wire shelf structures wherein each of the plurality of enclosable openings of the wire shelf structure is circumscribed by spaced apart vertical posts and a corresponding section of the peripheral support members of each of two adjacent horizontal shelves disposed between said posts, wherein said at least one panel has recessed corners that are suitably sized to allow said at least one panel to substantially enclose said one of the plurality of enclosable openings independent of bending contact with the means for mounting, whereby, said at least one panel substantially encloses said one of the plurality of enclosable openings while lying unobtrusively in a vertical plane which passes through the adjacent spaced apart vertical posts.

19. An enclosure system, for a wire shelf structure having at least two horizontal shelves with peripheral support members, with said horizontal shelves being mounted to spaced apart vertical posts by means for mounting, and wherein each of a plurality of enclosable openings of the wire shelf structure is circumscribed by spaced apart vertical posts and a corresponding section of the peripheral support members of each of two horizontal shelves disposed between said posts, comprising:

at least one generally rectangular resilient flat panel, each at least one panel being adapted for enclosing one of the plurality of enclosable openings, said at least one panel having a height when disposed in a vertical position that is greater than the distance between the peripheral support members of one of said two horizontal shelves and the peripheral support members of the other of said two horizontal shelves, and said panel having a width that is less than the distance between a first remote edge of one of the adjacent spaced apart vertical posts and a second remote edge of the other one of the adjacent spaced apart vertical posts, which posts partially circumscribe said one of the plurality of enclosable openings, and said at least one panel has recessed corners that are suitably sized to allow said at least one panel to substantially enclose said one of the plurality of enclosable openings independent of bending contact with the means for mounting, whereby, said at least one of the plurality of enclosable openings of the wire shelf structure can be substantially enclosed by flexibly bending the panel about a horizontal line to allow the distance between an upper edge and a lower edge of the panel to be less than the distance between the peripheral support members of one of said two adjacent horizontal shelves and the peripheral support members of the other of said two adjacent horizontal shelves, by inserting the respective upper and lower edges of the panel that is flexibly bent into said one of the plurality of enclosable openings, and then by allowing the panel to resiliently substantially flatten with said upper and lower edges secured by the respective peripheral support members of the wire shelf structure, and the entire procedure may be reversed to remove the enclosing panel.

20. The enclosure system of claim 19, wherein said at least one panel has a width that is less than the distance between the centerlines of the adjacent spaced apart vertical posts which partially circumscribe said one of the plurality of enclosable openings, whereby, said at least one panel lies unobtrusively in a vertical plane which passes through the adjacent spaced apart vertical posts.

21. The enclosure system of claim 20, wherein said at least one panel has a first side edge and a second side edge, and the first side edge and the second side edge are beveled, so that each beveled face of the respective side edges can make a generally tangential contact with one of the adjacent spaced apart vertical posts.

22. An enclosure system, for a wire shelf structure having at least two horizontal shelves with peripheral support members, with said horizontal shelves being mounted to spaced apart vertical posts by means for mounting, and wherein each of a plurality of enclosable openings of the wire shelf structure is circumscribed by two horizontal shelves and adjacent spaced apart vertical posts, comprising:

at least one generally rectangular resilient flat panel, said at least one panel being adapted for enclosing one of the plurality of enclosable openings, said at least one panel having a height when disposed in a vertical position that is greater than the distance between the peripheral support members of one of said two horizontal shelves and the peripheral support members of the other of said two horizontal shelves, and said panel having a width that is not substantially greater than the distance between a first remote edge of the adjacent spaced apart vertical posts and a second remote edge of the adjacent spaced apart vertical posts, which partially circumscribe said one of the plurality of enclosable openings, said panel further having recessed corners that are suitably sized to allow said panel to substantially enclose said one of the plurality of enclosable openings independent of bending contact with the means for mounting, whereby, said one of the plurality of enclosable openings of the wire shelf structure can be enclosed by flexibly bending the panel about a horizontal line to allow the distance between an upper edge and a lower edge of the panel to be less than the distance between the peripheral support members of one of said two horizontal shelves and the peripheral support members of the other of said two horizontal shelves, by inserting the respective upper and lower edges of the panel that is flexibly bent into said one of the plurality of enclosable openings, and then by allowing the panel to resiliently substantially flatten with said upper and lower edges secured by the respective peripheral support members of the wire shelf structure, and the entire procedure may be reversed to remove the enclosing panel.

23. The enclosure system of claim 22, wherein each of the recessed corners of said panel comprises an inverted arc.

24. The enclosure system of claim 22, wherein each of the recessed corners of said panel comprises a notch having an approximate 45 degree angle from each side edge of said panel.

25. An enclosure system, for a wire shelf structure having at least two horizontal shelves with peripheral support members, an intervening horizontal shelf disposed between said two horizontal shelves, and a front face, with said horizontal shelves being mounted to spaced apart vertical posts by means for mounting, and wherein each of a plurality of enclosable openings of the wire shelf structure is circumscribed by two adjacent spaced apart vertical posts and a corresponding section of the peripheral support members of each of the two horizontal shelves disposed between said posts, said intervening horizontal shelf has a lead wire extending outwardly from the front face, into another one of the plurality of enclosable openings and away from the intervening horizontal shelf, comprising:

at least one generally rectangular resilient flat panel, each said at least one panel being adapted for enclosing one of plurality of enclosable openings, said panel having a height when disposed in a vertical position that is less than the distance between the respective horizontal planes of said two horizontal shelves which partially circumscribe said one of a plurality of enclosable openings, said height further being greater than the distance between the horizontal plane of one of said two horizontal shelves and the peripheral support members of the other of said two horizontal shelves, and said panel having a width that is less than the distance between the centerlines of said adjacent spaced apart vertical posts, and said panel further having recessed corners that are suitably sized to allow said panel to substantially enclose said one of a plurality of enclosable openings independent of bending contact with the means for mounting;

at least one rotatable flat panel that has an upper edge and a lower edge, means for rotatably securing the at least one rotatable flat panel to a border of another one of the plurality of enclosable openings;

an elongated resilient wire cover having a cut along its length, said wire cover being adapted for covering at least a portion of the lead wire to provide a cushioning effect for said at least one rotatable panel being rotatably disposed in an the enclosing position, whereby, said one of plurality of said one of the plurality of enclosable openings of the wire shelf structure can be enclosed by flexibly bending said panel about a horizontal line to allow the distance between an upper edge and a lower edge of said panel to be less than the distance between the horizontal plane of one of said two horizontal shelves and the peripheral support members of the other of said two horizontal shelves, and inserting the respective upper and lower edges of said panel that is flexibly bent in to said one of the plurality of enclosable openings and then allowing the panel to resiliently substantially flatten with said upper and lower edges secured by the respective peripheral support members of the wire shelf structure, and the entire procedure may be reversed to remove the enclosing panel.

26. An enclosure system, for a wire shelf structure having at least two horizontal shelves with peripheral support members, with said horizontal shelves being mounted to spaced apart vertical posts by means for mounting, and wherein each of a plurality of enclosable openings of the wire shelf structure is circumscribed by adjacent spaced apart vertical posts and a corresponding section of the peripheral support members of each of two horizontal shelves disposed between said posts, comprising:

at least one generally rectangular resilient flat panel, each at least one panel being adapted for enclosing one of the plurality of enclosable openings, said at least one panel having a first transverse dimension parallel to a first edge of said panel that is greater than a first corresponding transverse dimension of said one of the plurality of enclosable openings, and a second transverse dimension that does not substantially exceed a second corresponding transverse dimension of said one of the plurality of enclosable openings, which is parallel to a second edge of said panel and perpendicular to the first transverse dimension, said at least one panel has recessed corners that are suitably sized to allow said at least one panel to substantially enclose said one of the plurality of enclosable openings independent of bending contact with the means for mounting, whereby, at least one of the plurality of enclosable openings of the wire shelf structure can be substantially enclosed by flexibly bending the at least one panel about a line perpendicular to the first transverse dimension to allow the distance between a first pair of opposite edges of the panel to be less than the first corresponding transverse dimension of said one of the plurality of enclosable openings, by inserting the respective said opposite edges of the panel that is flexibly bent into said one of the plurality of enclosable openings, and by then allowing the panel to resiliently substantially flatten with said opposite edges secured respectively by corresponding opposed edges of said one of the plurality of enclosable openings of the wire shelf structure, and the entire procedure may be reversed to remove the at least one panel.

27. An enclosure system, for a wire shelf structure having at least two horizontal shelves with peripheral support members, with said horizontal shelves being mounted to spaced apart vertical posts by means for mounting, and wherein each of a plurality of enclosable openings of the wire shelf structure is circumscribed by adjacent spaced apart vertical posts and a corresponding section of the peripheral support members of each of two horizontal shelves disposed between said posts, comprising:

at least one generally rectangular flat panel, each at least one panel being adapted for enclosing one of the plurality of enclosable openings, said at least one panel having a first transverse dimension parallel to a first edge of said panel that is greater than a first corresponding transverse dimension of said one of the plurality of enclosable openings, and a second transverse dimension that does not substantially exceed a second corresponding transverse dimension of said one of the plurality of enclosable openings, which is parallel to a second edge of said panel and perpendicular to the first transverse dimension, whereby, said at least one of the plurality of enclosable openings of the wire shelf structure can be substantially enclosed by inserting the second edge of said panel into said opening, by inserting an opposite edge of said panel into said opening, and allowing both the second edge and the opposite edge to be engaged respectively by corresponding opposed edges of said opening, and the entire procedure may be reversed to remove said panel.

28. The enclosure system of claim 27, wherein the at least one panel comprises recessed corners that are suitably sized to allow said panel to substantially enclose said opening independent of bending contact with the means for mounting.

29. The enclosure system of claim 27, wherein the at least one panel comprises at least one rotatable flat panel that has an upper edge and a lower edge, a plurality of holes disposed proximate to the upper edge, a height when disposed in a vertical position that is not substantially greater than a corresponding transverse dimension of said opening, and a width that is less than the distance between the centerlines of the adjacent spaced apart vertical posts, which posts partially circumscribe said opening, means for rotatably securing said rotatable panel to an upper border of said opening, whereby, the at least one rotatable flat panel can be rotated about the border of said opening from an unrestricting position to an enclosing position, by inserting the upper edge of said panel into said opening to the extent permitted by the means for rotatably securing, so that the lower edge of said panel can be disposed in said opening, and the entire procedure may be reversed to remove said panel.

30. The enclosure system of claim 29, wherein the at least one panel comprises recessed corners that are suitably sized to allow said panel to substantially enclose said opening independent of bending contact with the means for mounting.

31. The enclosure system of claim 30, wherein the recessed corners disposed along the upper edge of the rotatable panel are suitably sized to allow the upper edge of said panel to be inserted into said opening, while said upper edge is generally parallel to an upper border of said opening, so that the lower edge of said panel can be inserted into said opening independent of contact with the corresponding section of the peripheral support members disposed along a lower border of said opening.

32. The enclosure system of claim 27, further comprising means for stabilizing the panel including a plurality of split vinyl tubes with at least one of said plurality of split vinyl tubes disposed on a horizontal shelf wire that extends away from said opening and at a spaced distance from the corresponding peripheral support member of said opening, said spaced distance being sufficient for the edge of the panel to be disposed between said split vinyl tube and said corresponding peripheral support member.

33. An enclosure system, for a wire shelf structure having at least two horizontal shelves with peripheral support members, with said horizontal shelves being mounted to spaced apart vertical posts by means for mounting, and wherein each of a plurality of enclosable openings of the wire shelf structure is circumscribed by adjacent spaced apart vertical posts and a corresponding section of the peripheral support members of each of two horizontal shelves disposed between said posts, comprising:

at least one generally rectangular flat panel, each at least one panel being adapted for enclosing one of the plurality of enclosable openings, said at least one panel having a first transverse dimension parallel to a first edge of said panel that is greater than a first corresponding transverse dimension of said one of the plurality of enclosable openings, and a second transverse dimension that does not substantially exceed a second corresponding transverse dimension of said one of the plurality of enclosable openings, which is parallel to a second edge of said panel and perpendicular to the first transverse dimension, whereby, said at least one of the plurality of enclosable openings of the wire shelf structure can be substantially enclosed by inserting the second edge of said panel into said opening a predetermined distance, by inserting an opposite edge of said panel into said opening, and allowing both the second edge and the opposite edge to be engaged respectively by corresponding opposed edges of said opening, and the entire procedure may be reversed to remove said panel, and further comprising:

a track system having an upper channel and a lower channel between which the two panels can be slidingly supported, each channel having a pair of parallel elongated recesses for receiving an edge of one of the two panels, each recess having an innermost vertex, said upper channel being attached to the underside of one of the two adjacent horizontal shelves which is above the other of the two adjacent horizontal shelves, and said lower channel being attached to the topside of the other of the two adjacent horizontal shelves, each of said two panels has a height when disposed in a vertical position that is less than the distance between the respective vertices of the upper and lower channels, each of said two panels having a width that does not substantially exceed half the distance between the centerline of one of the adjacent spaced apart vertical posts and the centerline of the other adjacent spaced apart vertical posts, which posts partially circumscribe said at least one of the plurality of enclosable openings, whereby, each of said two panels can be slidingly disposed in the track system to enclose the at least one of the plurality of enclosable openings.

34. The enclosure system of claim 33, wherein the upper channel has a top wall and two substantially parallel sidewalls and a center wall which extend downwardly from the top wall, the lower channel has a bottom wall and two substantially parallel sidewalls and a center wall which extend upwardly from the bottom wall, and each of the top wall and the bottom wall has a plurality of holes adapted for socketing a ball connector; and wherein the track system further comprises:

at least one first snap fastener having an elongated body with a clip disposed on one end and a ball connector disposed on the other end, said clip being suitably sized to fasten to a horizontal shelf wire, said ball connector of the first snap fastener being suitably sized to fasten to one of the plurality of holes of the upper channel;

at least one second snap fastener comprising a u-shaped clamp with a handle, and a bolt with a ball connector disposed on an end thereof and a head disposed on another end thereof, said handle having an aperture suitably sized to allow the ball connector of the second snap fastener to pass through and impede the passage of the head, said upper channel being supported by the at least one first snap fastener with the ball connector thereof disposed in one of the plurality of holes and the clip being fastened to a horizontal shelf wire of the one of the two adjacent horizontal shelves which is above the other of the two adjacent horizontal shelves, and said lower channel being supported by the at least one second snap fastener with the ball connector thereof disposed in one of the plurality of holes and the u-shaped clamp being attached to the other of the two adjacent horizontal shelves, whereby, the track system is attached to the wire shelf structure and the two panels are slidingly disposed there between.

* * * * *